United States Patent
Foerg (10) Patent No.: US 9,140,387 B2
(45) Date of Patent: Sep. 22, 2015

(54) FIRESTOP COLLAR

(71) Applicant: Christian Foerg, Lamerdingen (DE)

(72) Inventor: Christian Foerg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 282 days.

(21) Appl. No.: 13/622,728

(22) Filed: Sep. 19, 2012

(65) Prior Publication Data

US 2014/0077043 A1    Mar. 20, 2014

(30) Foreign Application Priority Data

Sep. 20, 2011   (DE) .......................... 10 2011 083 035

(51) Int. Cl.
*E04B 1/94* (2006.01)
*F16L 5/04* (2006.01)
*A62C 2/06* (2006.01)
*F16L 57/04* (2006.01)
*H02G 3/04* (2006.01)

(52) U.S. Cl.
CPC . *F16L 5/04* (2013.01); *A62C 2/065* (2013.01); *F16L 57/04* (2013.01); *H02G 3/0412* (2013.01)

(58) Field of Classification Search
CPC .............. F16L 5/02; F16L 5/04; F16L 57/04; A62C 2/065; H02G 3/0412; Y10T 29/49865
USPC ........... 52/98, 99, 220.8, 232, 317; 248/74.1, 248/74.3, 74.5, 315, 694
See application file for complete search history.

(56) References Cited

U.S. PATENT DOCUMENTS

| | | | |
|---|---|---|---|
| 5,876,042 A | 3/1999 | Graf et al. | |
| 6,176,052 B1 * | 1/2001 | Takahashi | 52/232 |
| 6,725,615 B1 * | 4/2004 | Porter | 52/232 |
| 7,082,730 B2 * | 8/2006 | Monden et al. | 52/232 |
| 7,712,791 B1 * | 5/2010 | Whitehead | 52/232 |
| 8,397,452 B2 * | 3/2013 | Stahl et al. | 52/232 |
| 2007/0151183 A1 * | 7/2007 | Stahl et al. | 52/317 |
| 2011/0210222 A1 | 9/2011 | Van Walraven | |

FOREIGN PATENT DOCUMENTS

| | | |
|---|---|---|
| DE | 4325757 A1 | 2/1995 |
| DE | 10 2004 007700 | 9/2005 |
| DE | 102008031018 A1 | 7/2009 |
| EP | 0151328 A1 | 8/1985 |
| EP | 1 181 481 B1 | 2/2002 |

* cited by examiner

*Primary Examiner* — Tan Le
(74) *Attorney, Agent, or Firm* — Davidson, Davidson & Kappel, LLC

(57) ABSTRACT

A firestop collar including a support band made of sheet metal and an intumescent strip that runs along the support band and is connected to it. The support band is provided with several pre-defined cutting zones which are at a distance from each other in the lengthwise direction and which run crosswise to the lengthwise direction. The intumescent strip has cutting areas that are oriented in the same manner and in which the intumescent strip is thinner than it is in the adjacent areas in the lengthwise direction. The cutting areas coincide with the cutting zones of the support band.

11 Claims, 7 Drawing Sheets

Fig. 1

Prior Art

Fig. 11

FIRESTOP COLLAR

This claims the benefit of German Patent Application DE 10 2011 083 035.9, filed Sep. 20, 2011 and hereby incorporated by reference herein.

The present invention relates to a firestop collar comprising a support band made of sheet metal and an intumescent strip.

BACKGROUND

Figure 1:
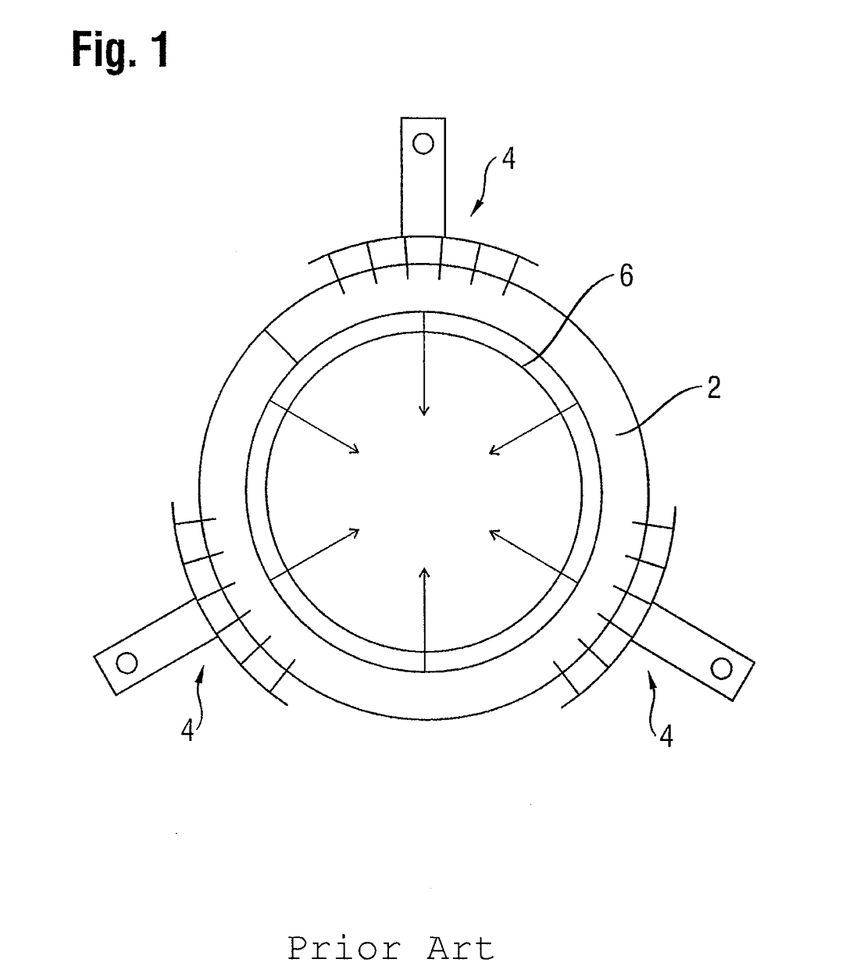
FIG. 1: a top view of a firestop collar.

Firestop collars are arranged around pipes or cables that pass through a penetration in a wall or ceiling, and they comprise intumescent material that expands upon exposure to heat, closing the penetration as tightly as possible so as to prevent propagation of the fire. This situation is shown by way of an example in FIG. 1, which depicts a top view of a firestop collar 2 that is secured to a wall with anchors 4. In case of fire, the intumescent material contained in the firestop collar 2 expands (as indicated by the arrows) in the direction of the penetration through which a pipe 6 passes. Depending on the number and size of the pipes, cable harnesses, etc. present in a wall or ceiling penetration, firestop collars of different diameters have to be provided in order to safeguard the penetration by means of fire-protection measures. This calls for logistical and financial resources.

European patent EP 1 181 481 B1 discloses a continuous strip which has transverse lines of weakening and which can be employed as a firestop collar for pipes of different sizes. A disadvantage of this strip, however, is that two work steps are necessary in order to cut them to size.

SUMMARY OF THE INVENTION

It is an object of the present invention to provide a firestop collar whose size can be flexibly adapted and which can also be easily processed.

The present invention provides a firestop collar comprising an intumescent strip and a support band made of sheet metal. The intumescent strip runs along the support band and is connected to it. The support band is provided with several pre-defined cutting zones which are at a distance from each other in the lengthwise direction of the support band and which run crosswise to the lengthwise direction. The intumescent strip has several cutting areas that are oriented in the same manner as the cutting zones of the support band. The intumescent strip is thinner in the cutting areas than it is in the adjacent areas in the lengthwise direction. The cutting areas coincide with the cutting zones.

The size of the firestop collar according to aspects of the invention can be flexibly adapted. For instance, the diameter of the firestop collar can be adapted to penetrations having different diameters, so that, at the same time, the external dimensions of the collar can be kept compact. Advantageously, the collar can be cut to length in a single work step. A cutting tool, for example, metal shears, can be used to cut the firestop collar to length.

According to one aspect of the invention, the support band of the firestop collar is configured in such a way that it can be cut more easily in the cutting zones. For this purpose, sheet metal employed in the cutting zones can be thinner than that used in the adjacent areas. The sheet metal in the cutting zone can also be perforated.

The width of the cutting zone or of the cutting areas is selected in such a way that a cutting tool can reach the cutting areas without being hindered, and without coming into contact with the adjacent thicker areas. This means that as little material as possible needs to be cut, thus requiring less expenditure of force in order to cut the firestop collar to length. Generally speaking, the cutting areas should be at least as wide as the cutting tool (e.g. the knife) or the part of the cutting tool that enters the cutting zone (e.g. the shear blades). For most (simple) cutting tools, a width within the range from 2 mm to 6 mm proves to be sufficient. However, it is possible to select the width of the cutting zone outside of this range.

According to one embodiment, the intumescent strip has a ribbed or wavy profile as seen in the lengthwise direction of the support band. The cutting areas of the intumescent strip are located in the wave valleys of this profile. The flanks of the wave peaks adjacent to a cutting area, which extend on both sides of the corresponding wave valley, are preferably slanted in such a way that the cutting area located in the wave valley can be easily accessed by a cutting tool.

Another criterion for the selection of this opening angle is that, if the firestop collar is wrapped around the smallest envisaged line diameter, the two flanks of the wave peaks only touch each other slightly or not at all.

According to another aspect of the invention, the thickness of the intumescent strip in the cutting area is 5 mm at the maximum. This thickness should preferably be selected in such a way that the structural unit consisting of the support band and the intumescent strip is sufficiently sturdy and does not break when the band is wrapped around a wiring harness. On the other hand, the thickness of the intumescent strip should be selected to be as thin as possible in the cutting area, so as to ensure that the firestop collar can be easily cut. Empirical testing has shown that a value of 5 mm at the maximum proves to be a good compromise. According to another embodiment, the width of the cutting area is at least 3 mm. This width should be selected to be big enough for a cutting tool to be securely positioned. Here, too, empirical testing has confirmed the cited value.

Cutting the firestop collar to length can be further simplified if, according to another embodiment, the intumescent strip, as seen in the lengthwise direction of the support band, consists of several separate blocks between which there is a space that forms a cutting area. Since in this case, the intumescent strip is no longer continuous, the connection between the intumescent strip and the support band can be improved in that, according to another aspect of the invention, the support band is provided with several hooks. These hooks can be created by stamping and bending sheet metal sections of the support band. Preferably, the sheet metal sections that form the hooks are provided with barbs on their side edges. Thus, the connection between the support band and the intumescent strip can be further improved.

According to one aspect of the invention, the stamped sheet metal sections are arranged in groups. The openings formed by stamping the sheet metal sections can overlap with the cutting zones. The openings preferably also overlap each other as seen in the lengthwise direction of the support band. Moreover, the openings can be acute triangles that are preferably arranged in such a way that they face in the direction of the cutting zones. A firestop collar according to one or more of the above-mentioned aspects, on the one hand, improves the connection between the support band and the intumescent strip and, on the other hand, achieves a systematic perforation in the cutting zone using the same measures, that is to say, stamping and bending the sheet metal sections. This makes it easier to sever the support band in the cutting zones.

According to another embodiment, holding tabs are provided on the edges of the support band. These holding tabs are at a distance from each other in the lengthwise direction of the support band and they are bent in such a way that they are in contact with the narrow side surfaces of the intumescent strip.

If an intumescent strip having a wavy profile is employed, the holding tabs, according to another embodiment, are preferably in contact with the end faces of the ribs of this wavy profile.

When a firestop collar is being manufactured, the intumescent strip is preferably cast onto the support band. This effective method is especially employed for firestop collars whose intumescent strip is continuous. In the case of firestop collars having an intumescent strip that is interrupted in the lengthwise direction and consisting of several separate blocks, the support band and the intumescent strip are preferably calendared together.

BRIEF DESCRIPTION OF THE DRAWINGS

Additional features and advantages of the invention ensue from the description below of advantageous embodiments making reference to the accompanying drawings. The following is shown.

DETAILED DESCRIPTION

Figure 2:
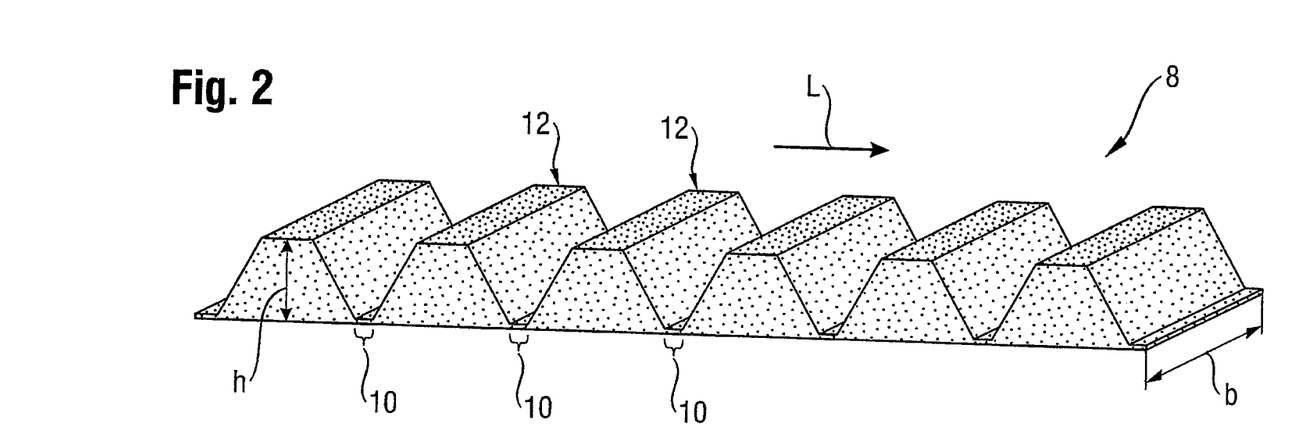
FIG. 2: a schematic perspective view of an intumescent strip for a firestop collar according to one embodiment.

FIG. 2 shows a schematic perspective view of an intumescent strip 8 for a firestop collar 2 according to a first embodiment. The intumescent strip 8 has cutting areas 10 located between the blocks 12 that are at a distance from each other in the lengthwise direction L. The intumescent strip 8 in these cutting areas 10 is thinner than in the adjacent areas, which have a maximum thickness h. Preferably, the thickness m of the intumescent strip 8 in the cutting areas 10 is 5 mm at the maximum. The width t of the cutting areas 10 (also see FIG. 2) in the lengthwise direction L is at least 3 mm. The width b of the intumescent strip 8 is preferably between 20 mm and 100 mm. The maximum height h of the blocks 12 is preferably between 4 mm and 30 mm.

Figure 3:
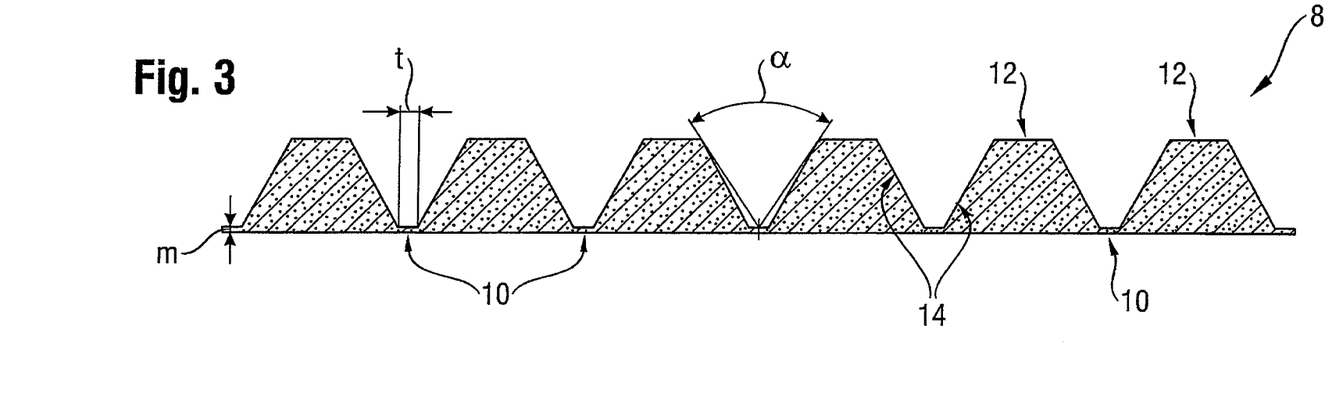
FIG. 3: a sectional view of this intumescent strip.

FIG. 3 shows a sectional view of the intumescent strip 8 known from FIG. 2. The minimum continuous band thickness m is dimensioned in such a way that the intumescent strip 8, together with a support band, forms a sufficiently sturdy unit that does not break when it is wrapped around a wiring harness. At the same time, the thickness m is selected to be so thin that the intumescent strip 8 can be easily cut, for instance, with metal shears. In order to be able to easily insert a cutting tool, for example, the metal shears, between the flanks 14 of the blocks 12 and to cut the firestop collar to the desired length in the cutting area 10, the slant of the flanks 14 is selected in such a manner that they enclose an opening angle a that is selected such that the flanks just barely do not touch each other after being wrapped around a pipe.

Figure 4:
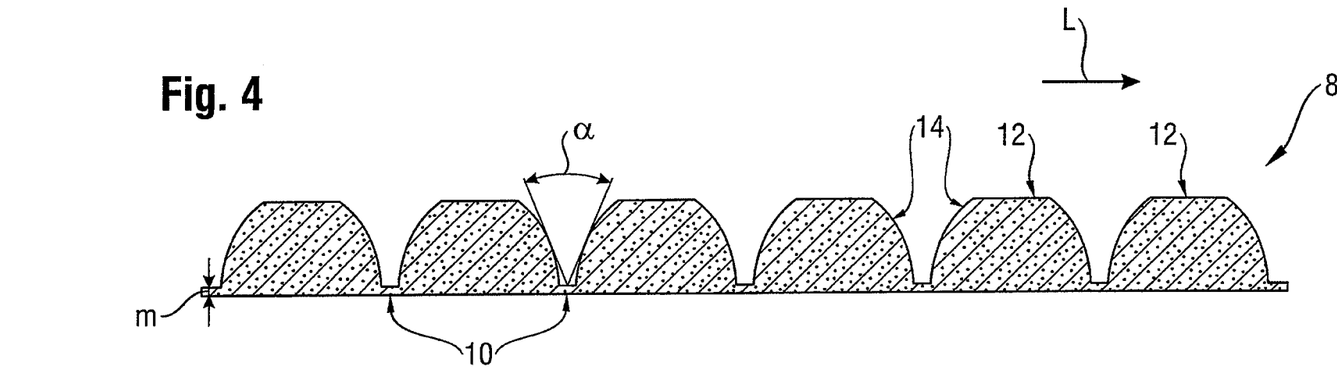
FIGS. 4 & 5: in each case, a sectional view of an intumescent strip for firestop collars according to additional embodiments.
Figure 5:
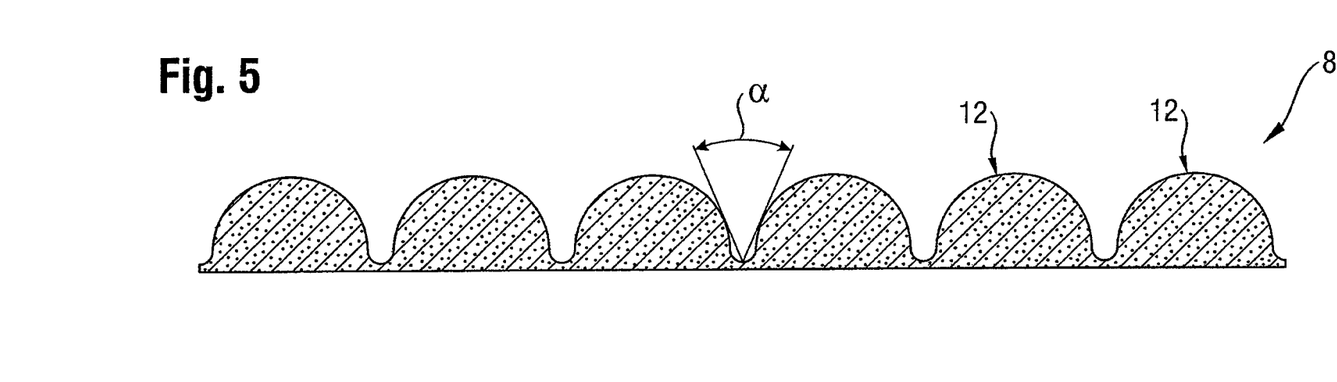

The intumescent strip 8 shown in FIGS. 2 and 3 has a ribbed profile. The intumescent strips 8 shown in a cross-sectional view in the subsequent FIGS. 4 and 5 are provided with a wavy profile (FIG. 5) and with a mixed wave-ribbed profile (FIG. 4). Once again, the flanks 14 of the blocks 12 are configured in such a way that they enclose at least an opening angle a that is likewise selected in such a manner that the flanks just barely do not touch each other after being wrapped around a pipe. Once again, a value m at least <5 mm applies to the maximum thickness m of the intumescent strip 8 in the cutting areas 10. The width of the cutting areas 10 in the lengthwise direction L is at least 3 mm.

The intumescent strips 8 shown in FIGS. 2 to 5 are preferably produced by means of an extrusion process. The production process can be continuous, and the desired ribbed or wavy structure is created by an appropriately shaped roller while the intumescent strip 8 is still soft.

Figure 6:
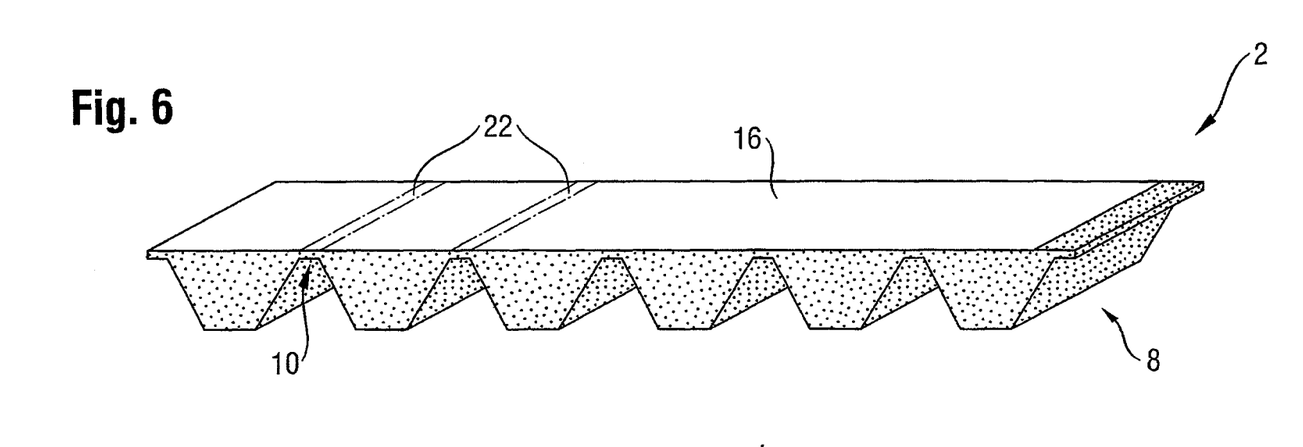
FIGS. 6 & 7: in each case, an intumescent strip for firestop collar according to additional embodiments.
Figure 7:
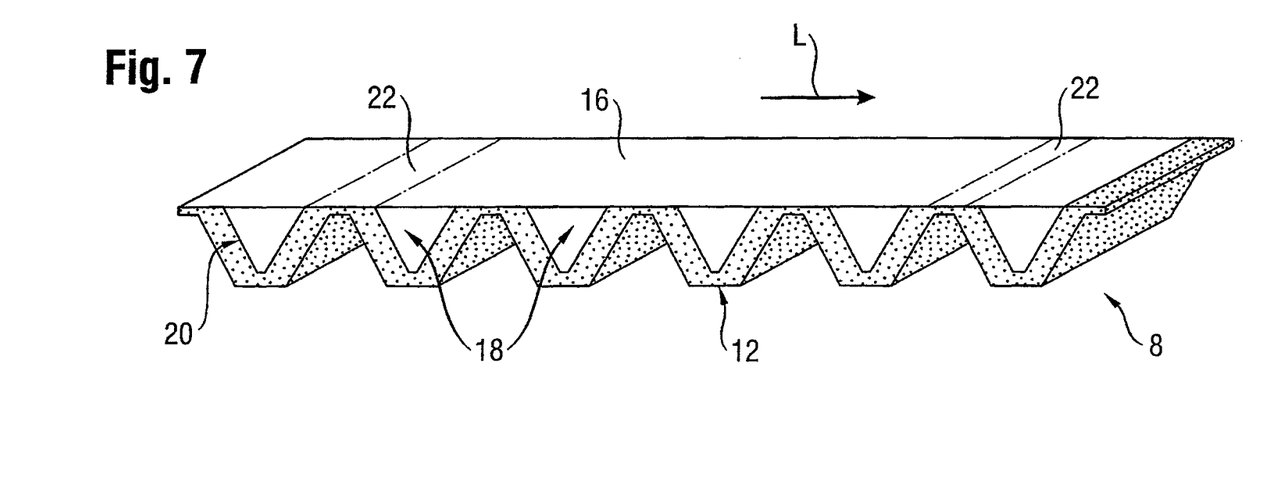

FIG. 6 shows a firestop collar 2 according to another embodiment. The back of the intumescent strip 8 shown in the lower section is applied onto a support band 16 made of sheet metal. Preferably, the firestop collar 2 is made by extruding the intumescent strip 8 directly onto the support band 16 and by subsequently structuring it appropriately. In order to improve the connection between the support band 16 and the intumescent strip 8, the support band 16 can be provided with bent holding tabs 18 spaced at a distance from each other in the lengthwise direction L, as shown in FIG. 7. In the embodiment shown, the holding tabs 18 of the support band 16 are located on the end faces 20 of the blocks 12 of the intumescent strip 8.

The support band 16 has cutting zones 22 that overlap with the cutting areas 10 of the intumescent strip 8. Preferably, the cutting zones 22 and the cutting areas 10 are congruent. The cutting zones 22 can preferably be dimensioned in such a way that it is easier to sever the firestop collar 2 in the cutting zones 22 or in the cutting areas 10. For example, the support band 16 can be thinner in the cutting zones 22 or can, for instance, be perforated by means of stamping.

Figure 8:
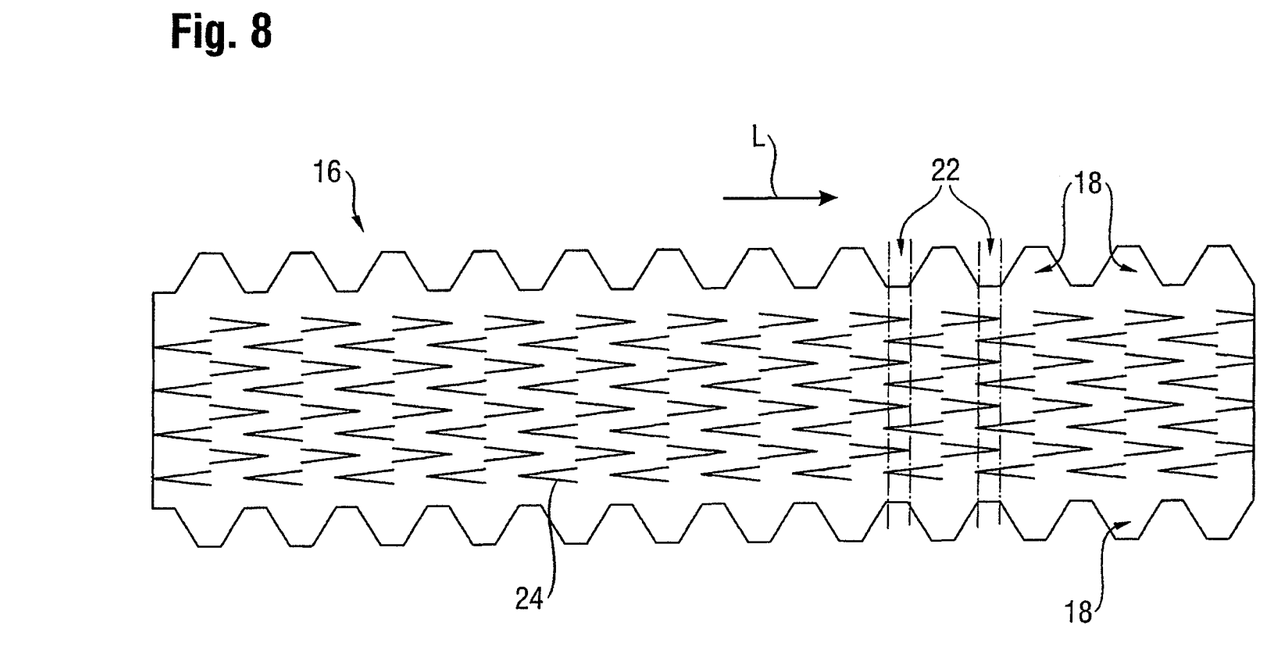
FIG. 8: a stamping pattern of a support band for a firestop collar according to one embodiment.

FIG. 8 shows the stamping pattern of a support band 16 that has a plurality of stamped openings 24 shaped like an acute triangle. Hooks 26 are formed by bending the stamped-out areas of the support band 16. This creates corresponding openings 25, likewise shaped in the form of an acute triangle, in the support band 16 (also see FIG. 9). These openings 25 overlap with the cutting zones 22 of the support band 16, as a result of which the latter is systematically weakened in the cutting zones 22, so that it can be cut more easily. It is advantageous that the openings 25 created by the stamping have the form of acute triangles which are each oriented in the direction of the cutting zones 22. In this manner, the support band 16 can be systematically perforated in the area of the cutting zones 22. It is likewise advantageous for the openings 25 to overlap as seen in the lengthwise direction L. Holding tabs 18 which, like the hooks 26, are bent in a subsequent work step, are located on the side edges of the support band 16.

Figure 9:
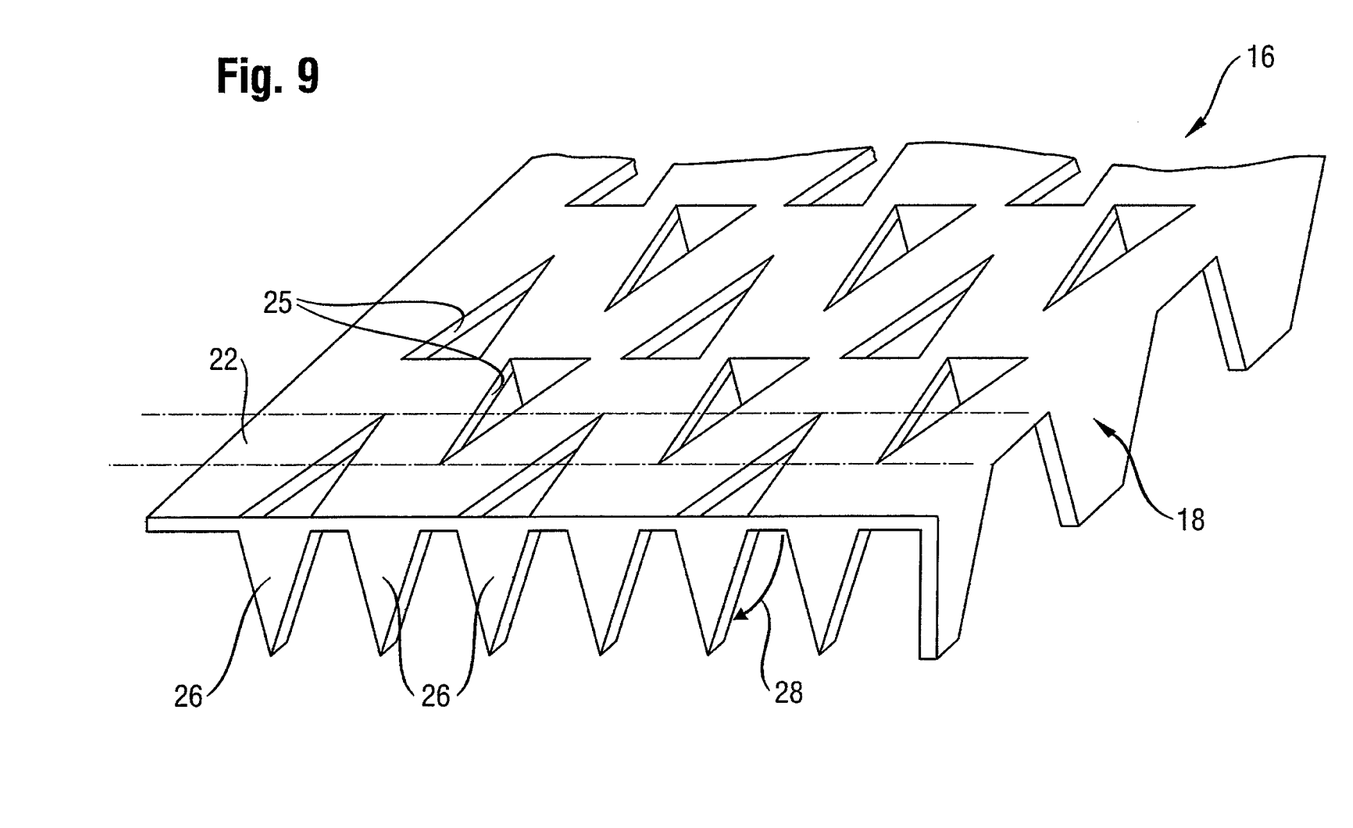
FIG. 9: a schematic perspective view of this support band in the bent state.
Figure 10:
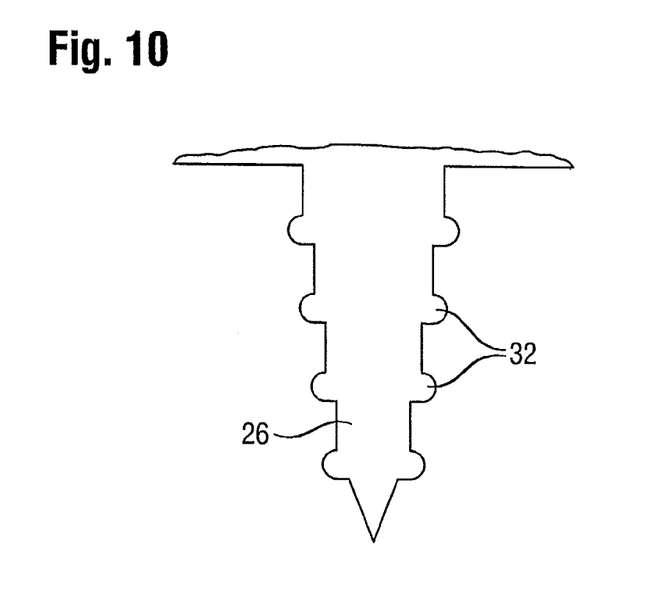
FIG. 10: a detailed view of a barbed sheet metal section of such a support band, according to one embodiment.
Figure 11:
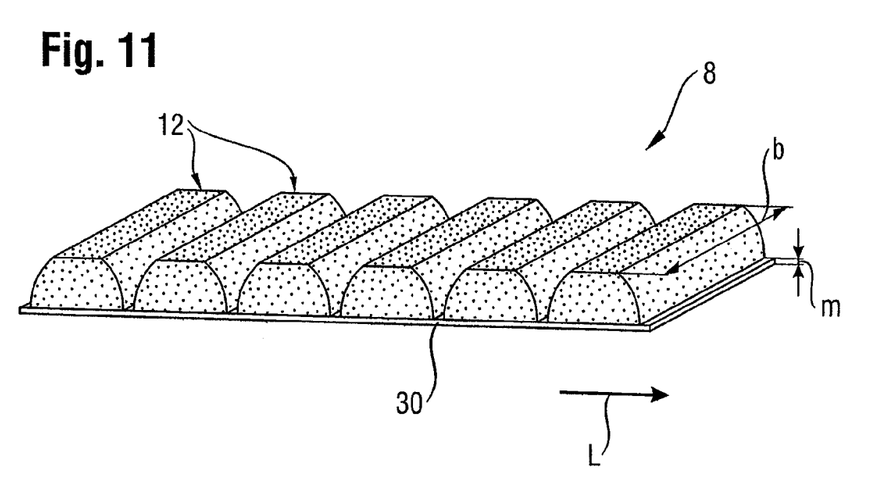
FIG. 11: a schematic perceptive view of a firestop collar according to another embodiment.

The result of this work step is shown in FIG. 9 in a simplified perspective view. The hooks 26 and the side tabs 18 protrude downwards out of the plane of the support band 16. The bending procedure is shown by appropriate arrows that indicate the bending direction 28. The support band 16 is weakened in the cutting zone 22 by the stamping and by the openings 25 created in this manner, as a result of which it can be cut more easily. In order to join the intumescent strip 8 to the support band 16, the intumescent strip 8 can be extruded onto the support band 16. A preferred alternative, however, consist of first extruding a trapezoidal strip of the intumescent material and subsequently gluing it to an intumescent support. FIG. 11 shows by way of an example such a structure in a perspective view. The trapezoidal blocks 12 can be manufactured by means of a continuous extrusion process and cut to the appropriate length (which corresponds to the width b of the intumescent strip 8). Subsequently, the individual blocks 12 can be glued onto an intumescent support 30 which can likewise be, for instance, an intumescent material, although it can also be a fabric band. The intumescent strip 8 produced in this manner is preferably calendared together with a support band 16 as shown by way of an example in FIG. 9. The hooks 26 present on the support band 16 can be provided with barbs 32, as depicted in FIG. 10. These barbs strengthen the connection between the support band 16 and the intumescent strip 8.

According to another embodiment, the blocks 12, unlike the method described in conjunction with the method described in FIG. 11, can be extruded or calendared directly onto the support band 16.

If the intumescent strip 8 includes individual blocks 12 separated in the lengthwise direction L, as shown in FIG. 11, then the minimum thickness m of the intumescent strip 8 in the cutting areas 10 (see, for instance, FIG. 3) is determined exclusively by the thickness of the intumescent support 30. If the blocks 12 are extruded or calendared directly onto the support band 16, then the minimum thickness m of the intumescent strip 8 equals zero (m=0). Only the support band 16 is present in the cutting area 10. In this manner, the firestop collar 2 can be severed particularly easily along the cutting zones 22.

The intumescent strip 8 can preferably be made out of casting resin that is poured or sprayed into a negative mold. The support band 16 can be laid into the still soft casting resin, and the intumescent strip 8 that is formed in the casting resin mold and the support band 8 are joined during the curing procedure. After the curing, the firestop collar 2 is ready to be used and can be cut to the required length.

What is claimed is:

1. A firestop collar comprising:
    a support band made of sheet metal, the support band including a plurality of pre-defined cutting zones at a distance from each other in a lengthwise direction of the support band and running crosswise to the lengthwise direction; and
    an intumescent strip running along the support band and connected to the support band, the intumescent strip having several cutting areas oriented in a similar manner where the intumescent strip is thinner than in adjacent areas in the lengthwise direction, the cutting areas coinciding with the cutting zones;
    wherein the support band includes a plurality of hooks created by stamping and bending sheet metal sections of the support band, and
    wherein the stamped sheet metal sections are arranged in groups and openings formed by stamping the sheet metal sections overlap with the cutting zones.

2. The firestop collar as recited in claim 1 wherein the intumescent strip has a ribbed or wavy profile as seen in the lengthwise direction of the support band.

3. The firestop collar as recited in claim 1 wherein the thickness of the intumescent strip in the cutting areas is 5 mm at the maximum.

4. The firestop collar as recited in claim 1 wherein the width of the cutting area is at least 3 mm.

5. The firestop collar as recited in claim 1 wherein the intumescent strip, as seen in the lengthwise direction of the support band, includes a plurality of separate blocks between which there is a space that forms the cutting area.

6. The firestop collar as recited in claim 1 wherein the openings overlap each other as seen in the lengthwise direction of the support band.

7. The firestop collar as recited in claim 1 wherein the openings are in the form of an acute triangle.

8. The firestop collar as recited in claim 1 wherein the sheet metal sections have barbs on their side edges.

9. The firestop collar as recited in claim 1 further comprising holding tabs on edges of the support band, the holding tabs being at a distance from each other in the lengthwise direction of the support band and being bent in such a way that they are in contact with the narrow side surfaces of the intumescent strip.

10. The firestop collar as recited in claim 1 wherein the intumescent strip is cast onto the support band.

11. The firestop collar as recited in claim 1 wherein the support band and the intumescent strip are calendared together.

* * * * *